United States Patent
Qi et al.

(10) Patent No.: US 11,778,672 B2
(45) Date of Patent: *Oct. 3, 2023

(54) RELATING TO POWER CONTROL IN INTEGRATED ACCESS AND BACKHAUL

(71) Applicant: Samsung Electronics Co., Ltd., Suwon-si (KR)

(72) Inventors: Yinan Qi, Middlesex (GB); Seunghoon Choi, Suwon-si (KR); Hyunseok Ryu, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/583,036

(22) Filed: Jan. 24, 2022

(65) Prior Publication Data

US 2022/0150959 A1    May 12, 2022

Related U.S. Application Data

(63) Continuation of application No. 16/586,812, filed on Sep. 27, 2019, now Pat. No. 11,234,277.

(30) Foreign Application Priority Data

Sep. 27, 2018 (GB) ...................... 1815780
Nov. 2, 2018 (GB) ...................... 1817991
Sep. 19, 2019 (GB) ...................... 1913508

(51) Int. Cl.
*H04W 72/04* (2023.01)
*H04W 74/08* (2009.01)
(Continued)

(52) U.S. Cl.
CPC ....... *H04W 74/085* (2013.01); *H04W 52/322* (2013.01); *H04W 72/0453* (2013.01); *H04W 88/085* (2013.01); *H04W 88/14* (2013.01)

(58) Field of Classification Search
CPC ............. H04W 52/322; H04W 52/362; H04W 72/0453; H04W 74/085; H04W 88/04; H04W 88/085; H04W 88/14; Y02D 30/70
See application file for complete search history.

(56) References Cited

U.S. PATENT DOCUMENTS

| 9,258,830 B2 | 2/2016 | Kim et al. |
|---|---|---|
| 2009/0190521 A1 | 7/2009 | Horn et al. |

(Continued)

FOREIGN PATENT DOCUMENTS

| EP | 2306766 A1 | 4/2011 |
|---|---|---|
| EP | 2742739 A1 | 6/2014 |

(Continued)

OTHER PUBLICATIONS

Intellectual Property India, "Examination Report under sections 12 &13 of the Patents Act," dated Feb. 23, 2022, in connection with Indian Patent Application No. 202027023020, 6 pages.

(Continued)

*Primary Examiner* — Mansour Oveissi

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is method of performing power control for transmission signals in a telecommunication system employing Integrated Access and Backhaul, IAB, comprising the steps of: determining whether Frequency, Time or Spatial Division Multiplexing, FDM, TDM, SDM is used on (Continued)

a particular pair of links; and applying a power control scheme accordingly.

10 Claims, 12 Drawing Sheets

(51) Int. Cl.
*H04W 52/32* (2009.01)
*H04W 72/0453* (2023.01)
*H04W 88/08* (2009.01)
*H04W 88/14* (2009.01)

(56) References Cited

U.S. PATENT DOCUMENTS

| | | |
|---|---|---|
| 2011/0081903 A1 | 4/2011 | Cai et al. |
| 2013/0010676 A1 | 1/2013 | Kim et al. |
| 2014/0029508 A1 | 1/2014 | Kim et al. |
| 2014/0334399 A1 | 11/2014 | Xu et al. |
| 2015/0334743 A1 | 11/2015 | Chevallier et al. |
| 2017/0006499 A1 | 1/2017 | Hampel et al. |
| 2017/0019932 A1 | 1/2017 | Su et al. |
| 2018/0092139 A1 | 3/2018 | Novlan et al. |
| 2018/0242367 A1 | 8/2018 | Kim et al. |
| 2018/0270875 A1 | 9/2018 | Hampel et al. |
| 2019/0053120 A1 | 2/2019 | Park et al. |
| 2019/0141754 A1 | 5/2019 | Bai et al. |
| 2020/0008233 A1 | 1/2020 | Xiong et al. |
| 2020/0015180 A1 | 1/2020 | Islam et al. |
| 2020/0015274 A1 | 1/2020 | Islam et al. |
| 2021/0159968 A1* | 5/2021 | Fujishiro ............... H04B 7/155 |

FOREIGN PATENT DOCUMENTS

| | | |
|---|---|---|
| KR | 10-2018-0022699 A | 3/2018 |
| WO | 2009/097456 A1 | 8/2009 |
| WO | 2011/112015 A2 | 9/2011 |
| WO | 2014/182493 A1 | 11/2014 |
| WO | 2015/175269 A1 | 11/2015 |
| WO | 2017/030412 A1 | 2/2017 |
| WO | 2020/014155 A1 | 1/2020 |

OTHER PUBLICATIONS

Supplementary European Search Report dated Sep. 22, 2020 in connection with European Application No. 19864871.9, 15 pages.
Decision of Patent dated Nov. 6, 2020 in connection with Korean Application No. 10-2020-7014056, 5 pages.
Combined Search and Examination Report dated Feb. 12, 2020 in connection with United Kingdom Application No. GB1913508.6, 7 pages.
Combined Search and Examination Report dated Feb. 26, 2019 in connection with United Kingdom Application No. GB1815780.0, 7 pages.
3GPP TR 38.874 VO.6.0 (Nov. 2018), Technical Report, 3rd Generation Partnership Project; Technical Specification Group Radio Access Network; Study on Integrated Access and Backhaul; (Release 15), Nov. 2018, 90 pages.
AT&T, Summary of 7.2.3.1 Enhancements to support NR backhaul links,: R1-1809941, 3GPP TSG RAN WG1 Meeting #94, Gothenburg, Sweden, Aug. 20-24, 2018, 18 pages.
CMCC, "Discussions on enhancements to support NR Backhaul links," R1-1808836, 3GPP TSG RAN WG1 Meeting #94, Gothenburg, Sweden, Aug. 20-24, 2018, 9 pages.
CMCC, "Discussions on enhancements to support NR Backhaul links," R1-1811035, 3GPP TSG RAN WG1 Meeting #94bis, Chengdu, China, Oct. 8-12, 2018, 12 pages.
Ericsson, "Updated summary of 7.2.3.1 Enhancements to support NR backhaul links," R1-1812042, 3GPP TSG RAN WG1 Meeting #94bis, Chengdu, China, Oct. 8-12, 2018, 22 pages.
Nokia, et al, "Enhancements on RACH for IAB," R1-1808583, 3GPP TSG RAN WG1 Meeting #94, Gothenburg, Sweden, Aug. 20-24, 2018, 4 pages.
Samsung, "Necessary Enhancements for NR IAB," R1-1810864, 3GPP TSG RAN WG1 Meeting #94b, Chengdu, China, Oct. 8-12, 2018, 12 pages.
ZTE, et al, "PRACH Resource Configuration," R1-1719345, 3GPP TSG-RAN WG1 Meeting #91, Reno, USA, Nov. 27-Dec. 1, 2017, 22 pages.
AT&T et al., "New SID Proposal: Study on Integrated Access and Backhaul for NR", 8881123GPP TSG RAN Meeting #75, Mar. 2017, RP-170821, 5 pages.
ISA/KR, International Search Report and Written Opinion of the International Searching Authority, International Application No. PCT/KR2019/012663, dated Jan. 13, 2020, 8 pages.
3GPP TR 38.874 V0.4.0 (Aug. 2018), Aug. 8, 2018, See p. 28 and the figure 8.2.4.2-1 (Year: 2018).
Islam et al., U.S. Appl. No. 62/734,165, filed Sep. 20, 2018, (Year: 2018).

* cited by examiner

RELATING TO POWER CONTROL IN INTEGRATED ACCESS AND BACKHAUL

CROSS-REFERENCE TO RELATED APPLICATIONS

This application is a continuation of U.S. patent application Ser. No. 16/586,812 filed on Sep. 27, 2019, which is based on and claims priority under 35 U.S.C. § 119 to United Kingdom Patent Application No. 1815780.0 filed on Sep. 27, 2018, United Kingdom Patent Application No. 1817991.1 filed on Nov. 2, 2018, and United Kingdom Patent Application No. 1913508.6 filed on Sep. 19, 2019, the disclosures of which are herein incorporated by reference in their entirety.

BACKGROUND

1. Field

The present disclosure relates to improvements in power control in Integrated Access and Backhaul (IAB) in a telecommunication network. IAB is used particularly in Fifth Generation (5G) or New Radio (NR) networks, but may be applicable in other systems also.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Further, the field of this disclosure relates generally to implementing random access in an integrated access and backhaul communication system. In particular, the field of this disclosure relates to a random access preamble design and offset configuration for an integrated access and backhaul communication system.

IAB is a technique whereby nodes may utilise radio links between themselves to provide backhaul connectivity, as well as radio links between nodes and User Equipment (UE) to provide access connectivity.

Embodiments of the present disclosure address these and other problems in the prior art.

SUMMARY

According to the present disclosure there is provided an apparatus and method as set forth in the appended claims. Other features of the disclosure will be apparent from the dependent claims, and the description which follows.

Embodiments of the disclosure address the power imbalance and power splitting problems associated with IAB nodes; they make the power control of IAB nodes more efficient.

According to a first aspect of the present disclosure, there is provided a method of performing power control for transmission signals in a telecommunication system employing Integrated Access and Backhaul (IAB) comprising the steps of: determining whether Frequency, Time or Spatial Division Multiplexing, (FDM, TDM, or SDM, respectively) is used on a particular pair of links; and applying a power control scheme accordingly.

Preferably, the pair of links may be arranged according on one or more of the schemes: a parent IAB node/donor node link to a relay IAB node is TDMed with a UE link; a downlink parent IAB node/donor node link to a relay IAB node is FDMed with an uplink UE link; an uplink parent IAB node/donor node link to a relay IAB node is FDMed with a downlink UE link; a downlink parent IAB node/donor node link to a relay IAB node is SDMed with an uplink UE link and/or an uplink child IAB node to a relay IAB node; and an uplink parent IAB node/donor node link to a relay IAB node is SDMed with a downlink UE link and/or a downlink relay IAB node to a child IAB node.

Preferably, each of the schemes has associated with the respective scheme at least one method of performing power control.

Preferably, power control steps applied to backhaul links, when compared to access links, are larger, greater in number or provided with a fixed step size with a step up/down indication.

Preferably, a message comprising information related to an interference level, such as RSRP or SINR, is transmitted from the relay IAB node to the parent IAB node, so that a transmission power of the parent IAB node may be adjusted.

Preferably, a transmission power of the UE can be adjusted by the relay IAB node by sending a power offset value via RRC, MAC CE or DCI.

Preferably, the relay IAB node splits available power between uplink backhaul links and downlink access links by means of one or more of power reservation, power compensation and power scaling.

Preferably, more than one of TDM, FDM and SDM are used simultaneously in a hybrid configuration.

Preferably, subframes associated with different multiplexing schemes are divided into multiple sets and different power control schemes are applied to different subframe sets either via explicit configuration or implicitly.

Preferably the different power control schemes are as identified in the following description prefaced with the label FDM, SDM or TDM, as appropriate.

In a second aspect of the disclosure, an integrated access and backhaul, IAB, wireless communication system is described that includes a first base station (e.g. a donor IAB node), at least one further base station, and a plurality of remote wireless communication units, wherein the communication units obtain access to the core network via at least the first base station, and in some examples via the at least one further base station to the first base station and thereafter to the core network. The base stations include: a transceiver; and a processor, operably coupled to the transceiver and arranged to: read broadcast system information and obtain therefrom a time and frequency location of a physical random access channel (PRACH), sometimes herein referred to as a 'MACH index' for a specific time and frequency location. The processor is also configured to determine whether the PRACH index for the base station itself (e.g., a relay IAB node) overlaps with an associated UE PRACH to be used by at least one of the communication units. If the processor determines that the PRACH index overlaps with a UE PRACH to be used by at least one of the communication units, the processor configures and applies a PRACH offset. The time and frequency location of the PRACH (e.g., PRACH index), with the offset, is then broadcast to the communication units, e.g., the UEs.

In this manner, by determining whether a PRACH overlap exists, and configuring an offset to be used with the PRACH in response to a positive determination, the IAB node is able to facilitate half-duplex operation of the IAB node and avoid PRACH conflicts. In some examples, the at least one further base station may include a second base station (e.g., a relay IAB node), a third base station (e.g., a child IAB node). In this example, the communication units may obtain access to the core network via the second base station to the first base station and thereafter to the core network, or in one example via the third base station to the second and then the first base station and thereafter to the core network.

In some optional examples, for example in a 5G system, the second base station (e.g., when configured as a relay IAB node), may be configured to derive a PRACH offset based on its own configuration index obtained from its parent (first) base station.

In some optional examples, the configuration of the time and frequency location of a PRACH offset may take into account resource allocations. For example, the configuration of the PRACH index offset may take into account whether communication links to UEs and any associated child IAB nodes and an offset UE PRACH should only be assigned to a child link (a link between the second base station and third base station).

In some optional examples, an offset may be based on a maximum configuration index. In some examples, the maximum configuration index may be '39'. In some examples, the binary maximum configuration index may be '64', thereby resulting in a range of −64 to 64. In some optional examples, the time and frequency location of the PRACH offset may include at least one resource from a group of: symbol, slot, subframe and system frame number, SFN. In some optional examples, a same resource may be fixed. In some optional examples the resource may traverse multiple resources from the group. In this manner, the granularity of the time and frequency location of PRACH offset (e.g., PRACH index offset) may vary.

In some optional examples, the PRACH configuration, e.g., periodicity, preamble formats, etc., may be different for the associated UEs and child IAB nodes. In this context, it is envisaged that in some scenarios it may be necessary to configure different offset values for the associated UEs and child IAB nodes separately.

In some optional examples, the system information includes at least one additional information element (IE) configured to support the time and frequency location of the PRACH offset (e.g., PRACH index offset). In some optional examples, the supported time and frequency location of the PRACH offset (e.g., PRACH index offset) may use an existing or modified IE. In some optional examples, at least one RACH information element, IE, parameter in radio resource control, RRC, state, from a group of multiple sets of RACH parameters may be configured, where the at least one RACH IE parameter comprises expansion of a RACH-ConfigGeneric. In some optional examples, the expansion of the at least one RACH IE parameter may include at least one from a group of: definition of a new RRC IEs; adding of a new parameter to configure different RACH settings; expansion of a value range of current parameters, to differentiate between RACH configurations.

In some optional examples, orthogonal time multiplexing configuration of the RACH may include at least one from a group of: time multiplexing of access link random access resources and backhaul link random access resources within a single time slot, time multiplexing of access link random access resources and backhaul link random access resources that are allocated different time slots, time multiplexing of access link random access resources and backhaul link random access resources that are allocated different bandwidth parts, BWP, of a carrier frequency.

In a third aspect of the disclosure, a second base station for an integrated access and backhaul, IAB, wireless communication system according to the second aspect is described.

In a fourth aspect of the disclosure, a remote wireless communication unit is described, such as a UE for an integrated access and backhaul, IAB, wireless communication system. The remote wireless communication unit comprises a receiver and according to the second aspect is described.

In a fifth aspect of the disclosure, a method for random access in an integrated access and backhaul, IAB, wireless communication system performed by the first base station according to the second aspect is described.

In a sixth aspect of the disclosure, a method for random access in an integrated access and backhaul, IAB, wireless communication system performed by the second base station according to the third aspect is described.

In a seventh aspect of the disclosure, a method for random access in an integrated access and backhaul, IAB, wireless communication system performed by the remote wireless communication unit, such as a UE, according to the fourth aspect is described.

Although a few preferred embodiments of the present disclosure have been shown and described, it will be appreciated by those skilled in the art that various changes and modifications might be made without departing from the scope of the disclosure, as defined in the appended claims.

Embodiments of the disclosure address the power imbalance and power splitting problems associated with IAB nodes; they make the power control of IAB nodes more efficient.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

Figure 1:
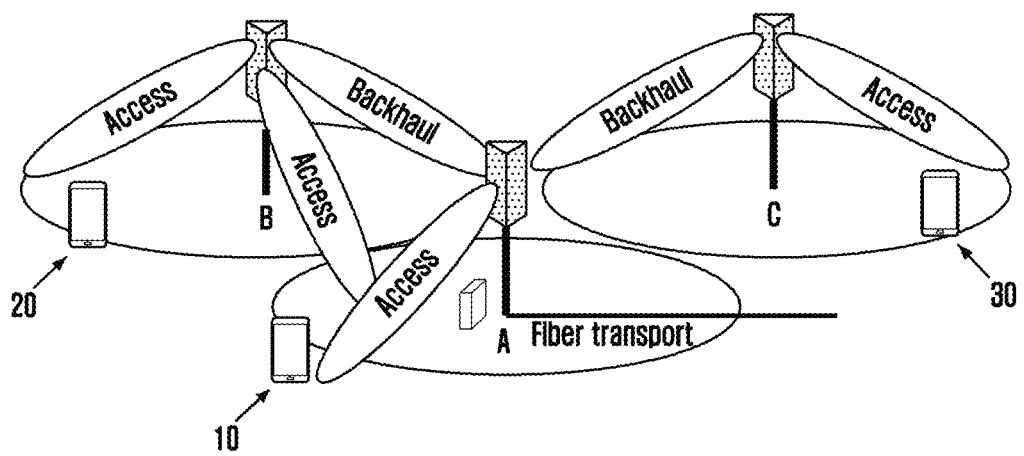
FIG. 1 shows a typical IAB configuration according to the prior art.

FIG. 1 shows a prior art IAB setup showing three nodes A, B, C, where backhaul connectivity is provided via radio links between nodes A and B, and A and C respectively. Node A is connected by fibre to the core network. Access radio links are also provided from nodes A and B to UE 10, from node B to UE 20, and from node C to UE 30.

In prior art IAB configurations, uplink power control is performed, but this does not address the problems encountered.

In practical IAB implementations, one of the problems encountered is power control for IAB nodes in Spatial Division Multiplexing (SDM)/Frequency Division Multiplexing (FDM). There are generally two issues as below:

Power imbalance when an IAB node receives simultaneously from its parent IAB node via backhaul (BH) link and from a UE via an access (AC) link. In such a case, the reception power from the parent IAB node is much higher than that from the UE and the received signal can cause problems such as strong interference, ADC saturation, etc.

Power splitting when an IAB node transmits simultaneously to its parent IAB node via backhaul (BH) link and to a UE/child IAB nodes via access link. In such a case, the transmission power in the BH link is controlled by its parent node but the IAB node determines its own transmission power to the UE/child IAB nodes. These two power values are correlated and they may affect each other.

In recent years, third generation (3G) wireless communications have evolved to the Long Term Evolution (LTE) cellular communication standard, sometimes referred to as 4$^{th}$ generation (4G) wireless communications. Both 3G and 4G technologies are compliant with third generation partnership project (3GPP™) standards. 4G networks and phones were designed to support mobile internet and higher speeds for activities, such as video streaming and gaming. The 3GPP™ standards are now developing a fifth generation (5G) of mobile wireless communications, which is set to initiate a step change in the delivery of better communications, for example powering businesses, improving communications within homes and spearheading advances such as driverless cars.

One of the potential technologies targeted to enable future cellular network deployment scenarios and applications is the support for wireless backhaul and relay links enabling flexible and very dense deployment of 5G-new radio (NR) cells without a need for densifying the transport network proportionately. Due to the expected larger bandwidth available for NR compared to long term evolved (LTE™) (e.g., mmWave spectrum) along with the native deployment of massive multiple-in/multiple-out (MIMO) or multi-beam systems in NR creates an opportunity to develop and deploy integrated access and backhaul (IAB) links. It is envisaged that this may allow easier deployment of a dense network of self-backhauled NR cells in a more integrated manner, by building upon many of the control and data channels/procedures defined for providing access to UEs. An example illustration of a network with such IAB links is shown in FIG. 4, where IAB nodes (or relay nodes (rTRPs) or relay IAB nodes, as these terms are used interchangeably herein) are configured to multiplex access and backhaul links in time, frequency, or space (e.g., beam-based operation).

Figure 4:
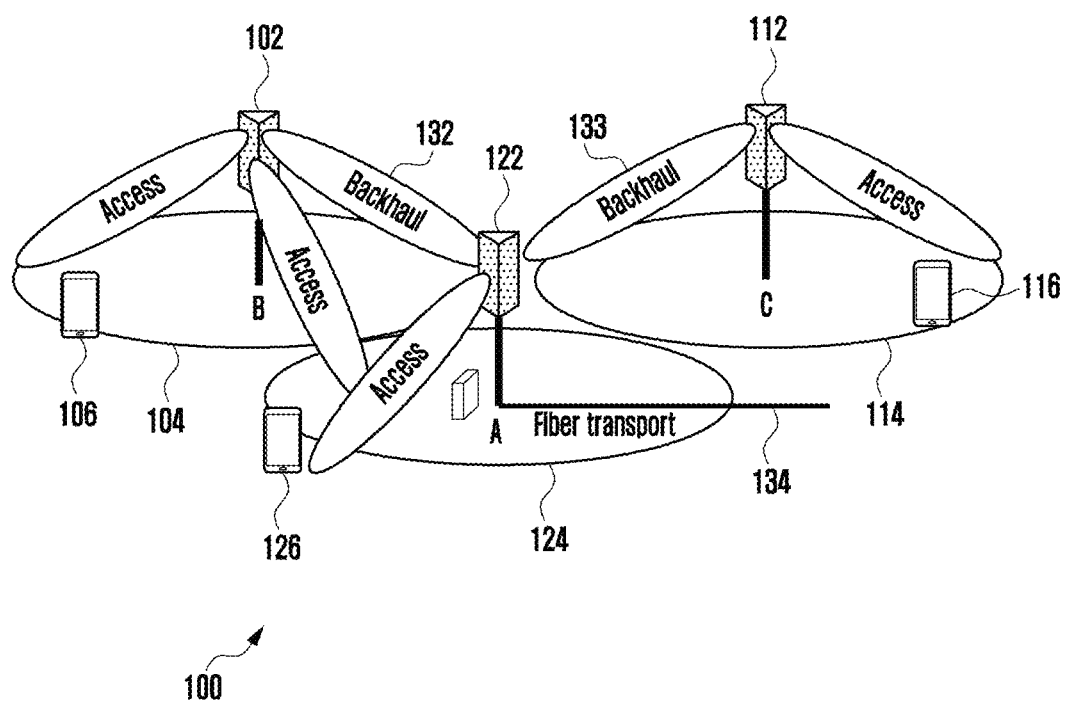
FIG. 4 illustrates a known simplified 5G architecture configured to support IAB.

Referring to FIG. 4, a known simplified 5G architecture diagram 100 illustrates how an Integrated Access and Backhaul (IAB) network is deployed. Here, a first 5G base station 102 supporting communications within a coverage area 104, including communication support for a wireless communication unit, sometimes referred to as a terminal device, such as a user equipment UE 106. In 5G, the UE 106 is able to support traditional Human Type Communications (HTC) or the new emerging Machine Type Communications (MTC). The known simplified architecture diagram 100 includes a second 5G base station 112 supporting communications within a coverage area 114, including communication support for a UE 116 and a third 5G base station 122 supporting communications within a coverage area 124, including communication support for a UE 126. A wireless backhaul connection 132, 133, generally an Xn (based on X2) interface connects the third 5G base station 122 with the first 5G base station 102 and second 5G base station 112. The third 5G base station 122 is also connected to the core network via a more traditional wired connection, such as fibre 134.

In this regard, in an IAB scenario, node A (i.e., third 5G base station 122) is considered a donor IAB node and node B (i.e., first 5G base station 102) and node C (i.e., second 5G base station 112) are identified as relay IAB nodes.

One of the main objectives of IAB is to provide radio access network (RAN)-based mechanisms to support dynamic route selection to accommodate short-term blocking and transmission of latency-sensitive traffic across backhaul links. This objective is also relevant to resource allocation (RA) between access and backhaul links under half-duplexing constraints. In the NR standard, there are three RA modes defined, namely time division multiplex (TDM), frequency division multiplex (FDM) and space division multiplex SDM (e.g., beam-based operation). No matter which RA scheme is applied, the inventors have identified that there always exists a problem for inter-relay channel monitoring for topology management when a communication (backhaul) blockage occurs.

When nodes B and C conduct random access, they can follow the same procedure as the UEs within the coverage of node A, e.g., UE 126. However, if the backhaul link 132 between node B and node A is blocked, node B might need to be connected to node C to form a multi-hop relay network. In such a case, the distance between node B and node C could be much larger than the distance between the node C UE 116 and node C (i.e., second 5G base station 112). Since the random access preamble format is decided by the cell radius, the preamble used for node C UE 116 might not be suitable for another IAB node, e.g., node B (i.e., first 5G base station 102). Hence, a first problem that the inventors have recognised and appreciated is the selection and use of preamble formats to achieve a particular coverage area in an IAB system.

Node A is the donor IAB node, node B and C are relay IAB nodes. When nodes B and C conduct random access, they can follow the same procedure as the UEs within the coverage of node A. However, if the backhaul link between B and A is blocked, node B might need to be connected to node C to form a multi-hop relay network. In such a case, the distance between B and C could be much larger than the distance between node C UE and node C. Since the random access preamble format is decided by the cell radius, the preamble used for node C UE might not be suitable for another IAB node, e.g., node B.

The timing for PRACH transmission can be configured by PRACH configuration index, as shown in Table 6.3.3.2-4 of TS 38.211, which is incorporated herein by reference. For example, if index '0' and index '2' are configured for IAB node and its associated UEs, for IAB node, slot 4, 9, 14, 19, 24, 29, 34, 39 will be used by IAB node to transmit PRACH and slot 9, 19, 29, 39 will be used by UEs to transmit PRACH. In slot 9, 19, 29 and 39, the IAB node needs to transmit PRACH and receive PRACH from UE at the same time, which violates the half-duplex constraint. Hence, a second problem that the inventors have recognised and appreciated is associated with the half-duplex constraint imposed in IAB system, whereby the IAB RACH occasions and UE RACH occasions should be configured to not overlap with each other.

Thus, examples of the disclosure aim to address or alleviate one or more of the abovementioned problems with known IAB systems.

Figure 2:
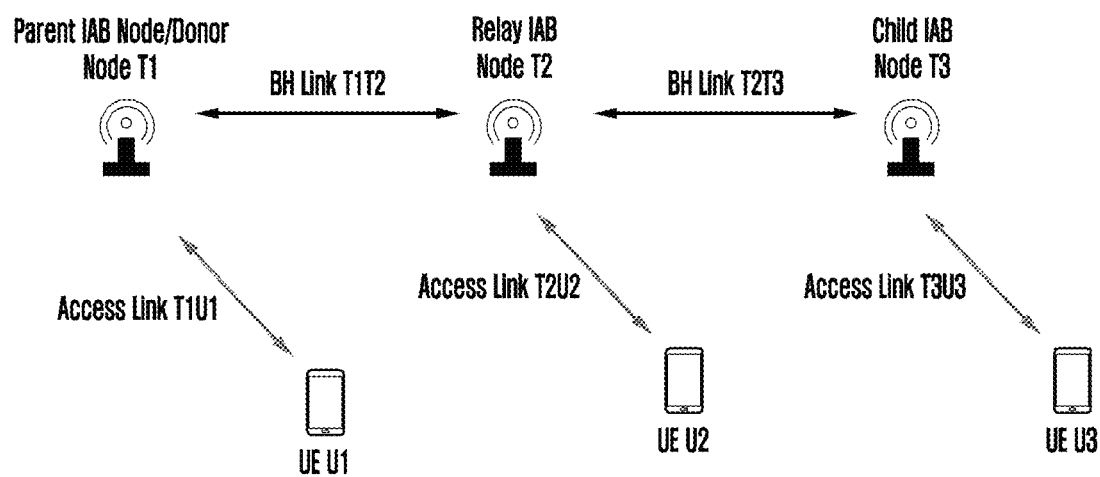
FIG. 2 shows an IAB configuration according to an embodiment of the present disclosure.

Embodiments of the disclosure deal with different configurations of BH and AC link multiplexing schemes, namely Time Division Multiplexing (TDM), Frequency Division Multiplexing (FDM) and Spatial Division Multiplexing (SDM). The IAB system according to an embodiment is illustrated in FIG. 2. Illustrated are three network nodes including parent IAB node/Donor IAB node T1, relay IAB node T2 and child IAB node T3. For each IAB node, a UE is also associated with the IAB node—U1, U2, U3 respectively. The various links are illustrated and named according to the entities involved e.g., link T2U2 is the radio link between node T2 and UE U2.

The following description describes TDM, FDM and SDM configurations in turn.

There are some commonalities, but some differences in approach for each case.

TDM

TDM is further divided into two cases:

TDM1-T1T2 is TDMed with T1U1

In this case, the AC links are completely TDMed with BH links. In such a case, the AC link T1U1 is TDMed with BH link T1T2. Normal power control procedure can be applied. However, considering the much larger transmission power range of an IAB node, the step size for closed-loop power control can be further enhanced. A larger step size may be considered.

This leads to the three following options which may be implemented, depending on the circumstances:

TDM1.1 Keep the power control command to 2 bits, meaning that four different update steps can be defined, e.g., {−3 dB, 0 dB, 3 dB, 5 dB}.

TABLE 1

| Step size for T1U1 | Step size for T1T2 |
| --- | --- |
| −1 | −3 |
| 0 | 0 |
| 1 | 3 |
| 3 | 5 |

TDM1.2 Increase the number of bits for power control command to N bits where N>2. For example, with 3 bits, 8 different update steps can be defined as {−5, −3, −1, 0, 1, 3, 5, 7}.

TABLE 2

| Step size for T1U1 | Step size for T1T2 |
| --- | --- |
| −1 | −5 |
| 0 | −3 |
| 1 | −1 |
| 3 | 0 |
| — | 1 |

TABLE 2-continued

| Step size for T1U1 | Step size for T1T2 |
| --- | --- |
| — | 3 |
| — | 5 |
| — | 7 |

TDM1.3 A fixed step size [X] is used and step-up, step-down and no change can be indicated by two bits. One example can be '00'=no change, '01'=step-up, '11'=step-down.

Another embodiment involves the update rate of power control for BH links. Since BH links are far more steady (i.e., less likely to change so frequently) than AC links, the update rate can be made much lower to reduce the signaling overhead.

TDM2-T1T2 can co-exist with T1U1

In this case, the AC links can co-exist with BH links in the same hop. For example, the AC link T1U1 can co-exist with BH link T1T2. However, the AC links and BH links are separated in time, frequency or spatial domain via scheduling or by beam steering (MU-MIMO) and the same methods as described above in TDM1 can be applied as well.

FDM

FDM is further divided into two cases:

FDM1—Downlink (DL) T1T2+Uplink (UL) T2U2

In this case, parent IAB node T1 and UE U2 transmit to the IAB node T2 simultaneously in an FDM manner. There should be a guard band between BH band and AC band. However, since the transmission power of the IAB node can be much larger than the UE, any power leakage from the BH band to the AC band might cause interference to the AC links. In such a case, the following alternative implementations can be considered:

FDM1.1 Closed-loop DL power control: if the relay IAB node, T2, detects that the interference caused by the BH link to the AC link is too strong and that the performance of the AC link is significantly degraded, the relay IAB node, T2, can send a negative power offset value to its parent IAB node, T1, to reduce the transmission power. Once the interference becomes acceptably low, the relay IAB node, T2, can either send a positive power offset to restore the transmission power of the parent IAB node, T1, gradually or send a power restore signal to restore the transmission power in one step. Such a message can be signaled via UCI in a dynamic manner.

FDM1.2 Closed-loop DL power control: instead of sending a power offset, the relay IAB node, T2, can signal the interference situation to the parent IAB node, T1. Such an indication of interference can be the Signal to Interference plus Noise Ratio (SINR) of the access link, Reference Signal Received Power (RSRP) of the access link, ratio of RSRP of backhaul link and access link, etc. Such a message can be signaled via UCI in a dynamic manner.

FDM1.3 Reset the UL power control: in order to prioritize the BH links, the parent IAB node, T1, transmission power is unchanged but UE UL transmission power control can add a power offset to the expected reception power. This offset can be signaled either semi-persistently via RRC, MAC or dynamically via DCI. However, it is possible that the UE cannot adjust its TX power, either because UE TX power has reached Pcmax or UE TX power has reached Pmin. In this case, this situation should be signaled to the parent IAB node, T1, so that the parent IAB node can decide if FDM1.1, above, needs to be applied.

It should be noted that for FDM1.1, FDM1.2 and part of FDM1.3, the relay IAB node, T2, can only make recommendations, and the final decision is made by the parent IAB node, T1. Also, any recommendation can be overridden by the parent IAB node, T1.

FDM2–UL T1T2+DL T2U2

In this case, the transmission power of relay IAB node, T2, in UL T1T2 is controlled by its parent IAB node, T1, but the transmission power of relay IAB node, T2, in DL T2U2 is controlled by itself. The total transmission power should be split between the two links. Priority should be given to BH link T1T2 but for DL T2U2, some power needs to be reserved, e.g., power for reference signals such as SS and CSI-RS. In order to satisfy such requirements, the following alternatives can be implemented, as required:

FDM2.1 Reserved power for DL AC link is reflected in the UL BH power control. For example, the transmission power in UL BH link can be defined as min{Pcmax-reserved power, original power control equation}. This reserved power can either be predefined or signaled by the relay IAB node, T2, to the parent IAB node, T1, e.g., via UCI or MAC-CE (like PHR);

FDM2.2 Priority is given to BH links and follows normal power control procedure. For the AC links, if the power available for reference signals is not enough, the relay IAB node, T2, can signal the parent IAB node, T1, and, at the same time in the AC link, the data power can be temporarily borrowed to transmit reference signals.

FDM2.3 Both the UL BH power control and AC link transmission power follow the normal procedure and if the final power summation is above the maximum transmission power of the relay IAB node, T2, these two power values can be scaled down to the maximum transmission power. Such power scaling should be signaled to the parent IAB node, T1, e.g., via UCI, so that the parent IAB node will not request higher transmission power for the IAB relay node.

FDM2.4 Guaranteed maximum power can be defined for UL T1T2 and DL T2UE, respectively, namely P_UL for T1T2 and P_DL for T2UE. These values can be configured by parent relay node, T1, or the gNB. Basically, the relay node, T2, calculates transmission power for UL and DL. If the calculated power does not exceed the guaranteed power, then the relay node, T2, uses the calculated value. However, if the calculated power exceeds P_UL or P_DL, then the calculated power can be scaled. Here, there could be several different scenarios:

Scenario-1: the calculated power for UL (P1)>P_UL but the calculated power for DL (P2)<P_DL
Transmission power of UL can be scaled down and DL TX power is kept Scenario-2: P1<P_UL and P2>P_DL
Transmission power of DL can be scaled down and UL TX power is kept.

Scenario-3: P1<P_UL and P2<P_DL
No scaling

Scenario-4: P1>P_UL and P2>P_DL
Both need to be scaled

FDM2.5 Guaranteed minimum power can be defined for UL T1T2 and DL T2UE, respectively, namely P_UL for T1T2 and P_DL for T2UE. These values can be configured by the parent relay node or gNB. Basically, the relay node calculates transmission power for UL and DL. If the calculated power is not lower than the guaranteed power, then relay node uses the calculated power. However, if the calculated power is lower than P_UL or P_DL, power borrowing should be applied. Here, there could be different scenarios:

Scenario-1: the calculated power for UL (P1)<P_UL but the calculated power for DL (P2)>=P_DL
Transmission power of DL can be borrowed to boost the UL Tx power Scenario-2: P1>=P_UL and P2<P_DL
Transmission power of UL can be borrowed to boost DL TX power.

Scenario-3: P1>=P_UL and P2>=P_DL
No scaling

Scenario-4: P1<P_UL and P2<P_DL
This scenario cannot happen

SDM

SDM is further divided into two cases:

SDM1–DL T1 T2+UL T2U2

Note that in the following, the terms inter-panel and intra-panel are used. In this context, inter-panel means multiple panels are available, each having its own RF chain and baseband processing capability. As such, each panel has its own power budget and power need not be shared between them. In the example of FIG. 2, node T2 might be in communication with nodes T1 and T3 as well as UE U2. Each link has its own dedicated panel. In the intra-panel case, 1 panel is provided, having common RF chain and baseband processing, but serving several antennas/beams. In the example of FIG. 2, the links from T2 to T1, T3 and U2 would all need to share power from a common power budget, even though they are served by separate beams/antennas.

SMM1.1 (inter-panel) In such a case, concurrent reception with two separate basebands is assumed. The resources used by two links are overlapping and the IAB to UE interference problem could be more significant than FDM case. However, the same solutions identified in FDM above can be easily applied to SDM as well.

SDM1.2 (intra-panel) In such a case, concurrent reception is via a single baseband is assumed. In addition to the interference problem aforementioned, another problem is that the received power from the DL T1T2 BH link could be much stronger than that from the UL T2U2 AC link. Under such circumstances, the operation of the Analog to Digital Convertor (ADC) could be a problem. If the conversion/quantization granularity of the received analog signal is based on the BH link power range, then for the AC link signal from UE U2 the conversion/quantization granularity could be too coarse. On the contrary, if the granularity conversion/quantization of the received analog signal is based on the AC link power range, then for the BH link the conversion/quantization granularity could be unnecessarily fine. One solution is to use non-linear granularity where the granularity is finer for small power values and larger for large power values. Another option is to use coarse granularity for IAB signal first and once the IAB signal is detected, the IAB signal can be removed from the received signal and then a finer granularity can be used for UE signal.

SDM2–UL T1T2+DL T2U2

SDM2.1 (inter-panel) The transmission power splitting problem in FDM might also apply to SDM. However, for the inter-panel case with separate basebands, there may be two separate panels transmitting in UL T1T2

BH and DL T2U2 AC links and they do not need to share power. Without this power sharing constraint, each panel can configure its own transmission power and the power control in UL T1T2 BH link can also be separated from DL T2U2 AC link transmission power configuration. Therefore, a normal power control procedure can be followed.

SDM2.2 (intra-panel) For the intra-panel case, power sharing between two links is needed. The same options described above as FDM2.1-FDM2.5 can also be applied here.

In addition to the single multiplexing schemes described so far, it is also possible that a system supports a hybrid multiplexing scheme and different schemes/combinations are chosen depending on circumstances. As mentioned, different power control schemes may be applied for different multiplexing schemes and the configuration should either be implicitly or explicitly signaled. The following embodiments are provided:

Implicit: multiple subframe sets are defined for multiple multiplexing schemes and there is a pre-defined association between multiplexing scheme and power control algorithm applied. Once the sub-frame set type is known, the corresponding power control scheme can be chosen accordingly;

Explicit: the gNB explicitly indicates/configures which Closed Loop Power Control (CLPC) processes (i.e., the index '1' in power control formula) should be used for a certain slot format by DCI, MAC CE, RRC, etc.

For the "explicit" case above, the configuration can either be centralized by the donor IAB node or distributed by each parent IAB node.

Figure 3:
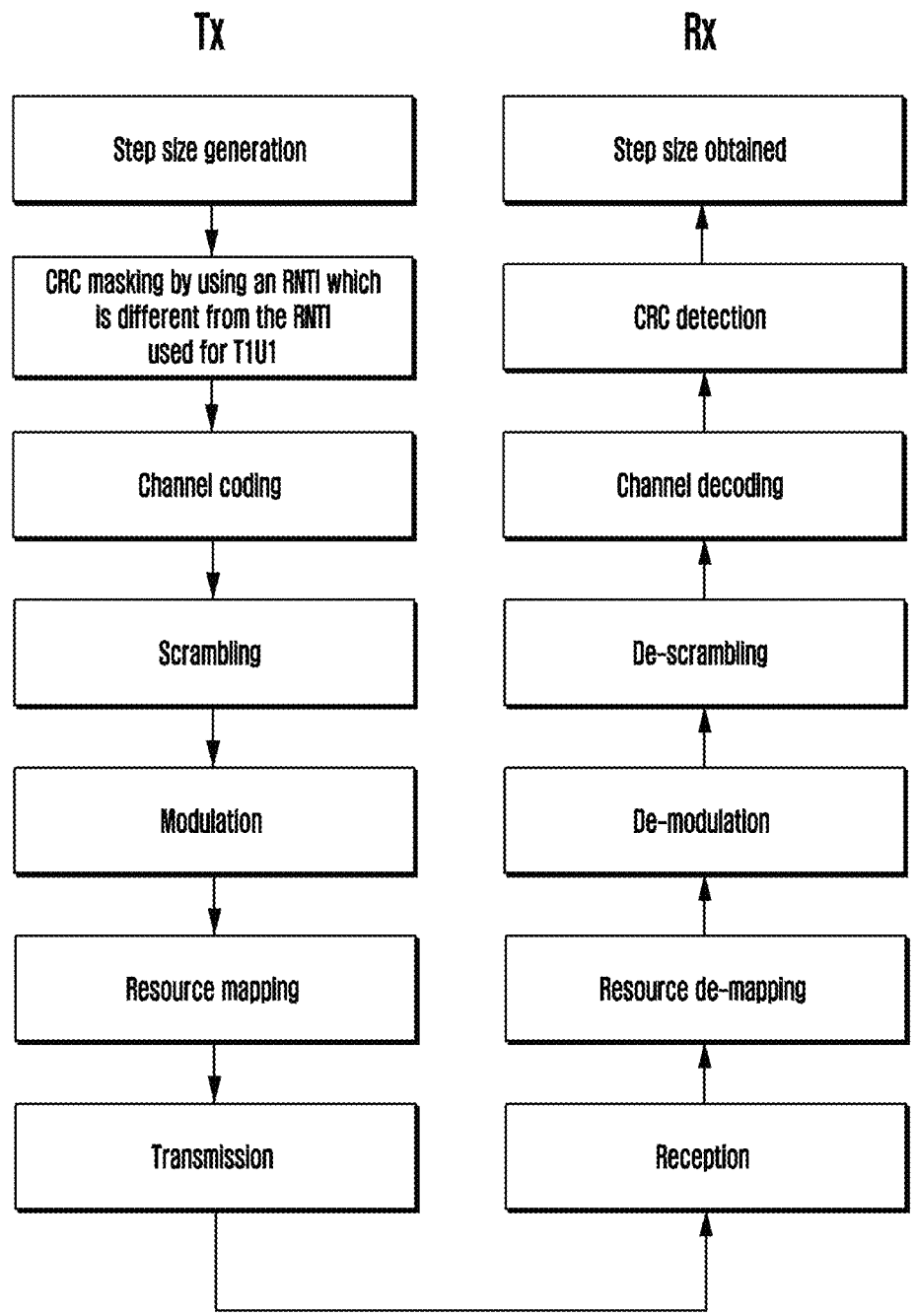
FIG. 3 shows a flowchart showing a method according to an embodiment of the present disclosure.

FIG. 3 shows a flowchart illustrating the steps involved in signalling the step size for power control. This illustrates how the power control related configurations, according to embodiments of the present disclosure, for IAB, e.g., step size, are signalled from gNB to the UE or the other way around.

Examples of the disclosure describe a wireless communication system that includes a mechanism for improved efficiency of random access for IAB nodes in an IAB architecture. In accordance with examples of the disclosure, an offset value is introduced to UE PRACH transmissions, when they are determined as conflicting with the IAB node PRACH, e.g., the UE PRACH is offset by, say, −1 slot. For example, if index '0' and index '2' are configured for IAB node and its associated UEs, for IAB node, slot 4, 9, 14, 19, 24, 29, 34, 39 will be used by IAB node to transmit PRACH. Also, slots 9, 19, 29, 39 will be used by UEs to transmit PRACH. However, in accordance with examples of the disclosure, and after applying a suitable offset by, say, −1 slot, the UE PRACH slots are now 8,18,28,38. In this manner, the UE PRACH slots no longer conflict with the IAB node PRACH slots, and the IAB node is now able to transmit PRACH and receive PRACH from UE at the same time in a manner that does not violate the half-duplex constraint.

Although examples of the disclosure are described with reference to introducing a −1 slot offset, it is envisaged that any suitable resource offset, e.g., a −2 slot offset, a −3 slot offset, a subframe offset, a symbol offset, etc. may be used.

Although example embodiments of the disclosure are described with reference to different random access configurations for IAB nodes and UEs in a 5G architecture, it is envisaged that some aspects of the disclosure are not so constrained/limited. For example, it is envisaged that the different random access configurations may be enacted for a long Term Evolved (LTE™) system, or other such communication systems that utilise random access techniques.

Example embodiments are described with respect to FR2, since the main focus of IAB is on above FR2, i.e., 24.25 GHz-52.6 GHz. However, it is envisaged that the examples described herein apply equally to FR1, i.e., 450 MHz-6 GHz.

Example embodiments are described with reference to radio access networks, which term encompasses and is considered to be equivalent to and interchangeable with communication cells, namely the facilitation of communications within a cell that may access other parts of the communication system as a whole.

Figure 5:
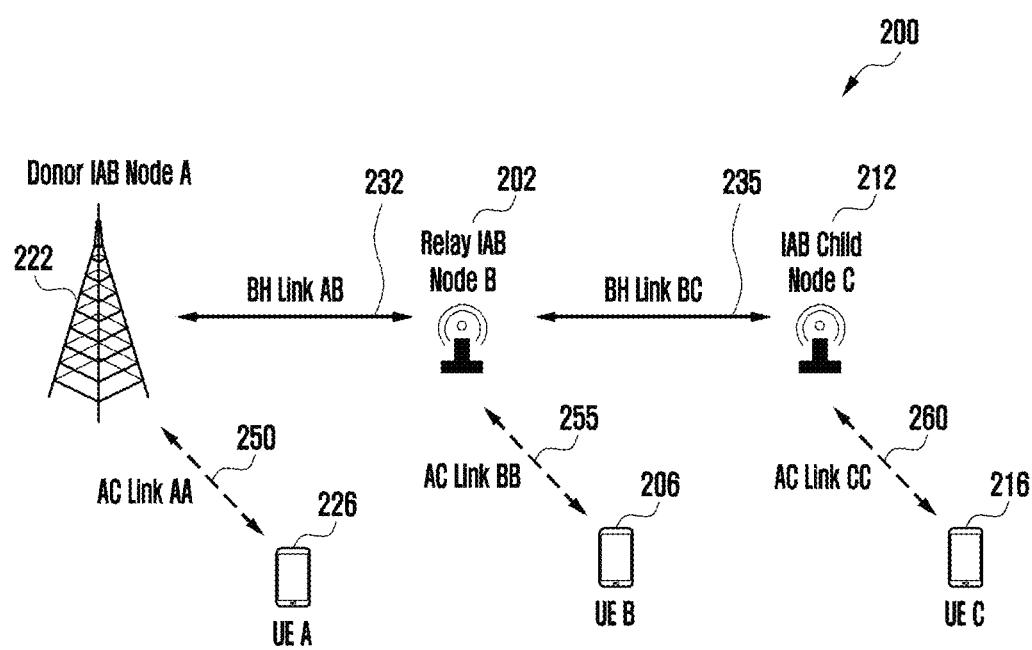
FIG. 5 illustrates a simplified 5G architecture configured to support IAB, according to examples of the disclosure.

Referring now to FIG. 5, part of a wireless communication system 200 is shown in outline, in accordance with one example embodiment of the disclosure. The wireless communication system 200 illustrates how an Integrated Access and Backhaul (IAB) network may be deployed in accordance with one example embodiment of the disclosure, where separate RACH is provided for use by an IAB node, e.g., a relay IAB node requiring a backhaul link or RACH access, and UEs requiring RACH access. Here, a donor IAB node A (sometimes referred to as a parent IAB node) 222 is configured to receive first access control RACH requests 250 from wireless communication units, sometimes referred to as a terminal device, such as a user equipment UE 226. In the context of the present disclosure, a relay IAB node B (e.g., a 5G base station) 202 uses a separate second RACH to access the donor IAB node to form a backhaul link 'AB' 232. Such a backhaul link may also carry communications to/from a second UE B 206, which has used a RACH access 255 to connect to the relay IAB node B 202.

Similarly, a further relay IAB child node C (e.g., a 5G base station) 212 uses a separate RACH to access the relay IAB node B 202 to form a backhaul link 'BC' 235, and thereafter the donor IAB node by joining the backhaul link 'AB' 232. Such a backhaul link may also carry communications to/from a third UE C 216, which has used a RACH access 260 to connect to the further relay IAB child node C 212.

Figure 8:
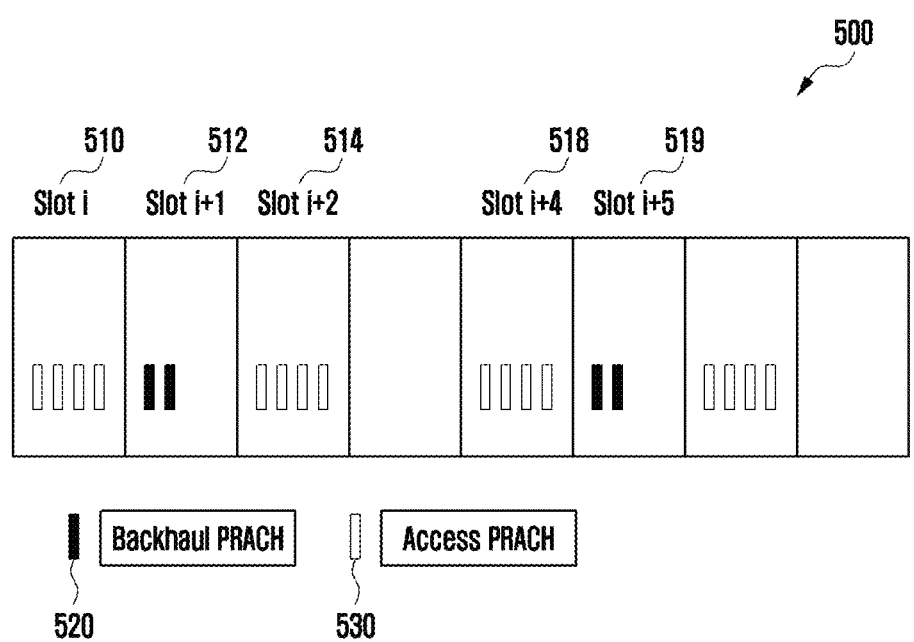
FIG. 8 illustrates a representation of a Time multiplexing of access link and backhaul link random access resources, with a representation of a random access resource allocation with offset for access link, according to examples of the disclosure.

The number of UEs associated with one IAB node, e.g., IAB child node C 212 in FIG. 5, could be much larger than the number of IAB nodes connected to IAB child node C 212. In fact, in practice, there might be only a very limited number of IAB nodes expected to be connected to a parent IAB node (i.e., an IAB node that serves relay IAB nodes). In NR, some resources in terms of symbol, slot, subframe and system frame number (SFN) are allocated for physical random access channels (PRACH) as shown in FIG. 8 and the periodicity of such resources are short so that UEs are able to transmit their random access preambles as soon as possible without causing too many collisions.

In accordance with one example of the disclosure, the IAB nodes 202, 212 and Ues such as UE 226 are allocated different preamble formats within RACH, to identify to the recipient (donor) IAB node 222 whether the RACH emanated from another IAB node 202, for example due to a backhaul blockage, or whether the RACH emanated from a UE 226. In accordance with another example of the disclosure, the IAB nodes 202, 212 and Ues, such as UE 226, may be allocated different time and/or frequency configurations within RACH, to identify to the recipient (donor) IAB node 222 whether the RACH emanated from another IAB node 202, for example due to a backhaul blockage, or whether the RACH emanated from a UE 226. In some examples of the disclosure, it can be appreciated that, to the donor IAB node 222, the 'relay IAB node B' 202 is a child IAB node, and to the relay IAB node B 202, the child IAB node C 212 in FIG. 5 is a child IAB node and the donor IAB node A 222 is a parent IAB node.

In the context of the present disclosure, the selection of preamble formats to be divided between IAB use and UE use can be made from the known preamble formats. The preamble formats for FR2 are defined in the below table 3 from the 3GPP standard at 6.3.3.1-2:

$$L_{RA} = 139 \quad \Delta f^{RA} = 15 \cdot 2^\mu \text{ kHz} \quad \mu \in \{0, 1, 2, 3\}$$

TABLE 3

| Format | $L_{RA}$ | $\Delta f^{RA}$ | $N_u$ | $N_{CP}^{RA}$ | Support for restricted sets |
|---|---|---|---|---|---|
| A1 | 139 | $15 \cdot 2^\mu$ kHz | $2 \cdot 2048\kappa \cdot 2^{-\mu}$ | $288\kappa \cdot 2^{-\mu}$ | — |
| A2 | 139 | $15 \cdot 2^\mu$ kHz | $4 \cdot 2048\kappa \cdot 2^{-\mu}$ | $576\kappa \cdot 2^{-\mu}$ | — |
| A3 | 139 | $15 \cdot 2^\mu$ kHz | $6 \cdot 2048\kappa \cdot 2^{-\mu}$ | $864\kappa \cdot 2^{-\mu}$ | — |
| B1 | 139 | $15 \cdot 2^\mu$ kHz | $2 \cdot 2048\kappa \cdot 2^{-\mu}$ | $216\kappa \cdot 2^{-\mu}$ | — |
| B2 | 139 | $15 \cdot 2^\mu$ kHz | $4 \cdot 2048\kappa \cdot 2^{-\mu}$ | $360\kappa \cdot 2^{-\mu}$ | — |
| B3 | 139 | $15 \cdot 2^\mu$ kHz | $6 \cdot 2048\kappa \cdot 2^{-\mu}$ | $504\kappa \cdot 2^{-\mu}$ | — |
| B4 | 139 | $15 \cdot 2^\mu$ kHz | $12 \cdot 2048\kappa \cdot 2^{-\mu}$ | $936\kappa \cdot 2^{-\mu}$ | — |
| C0 | 139 | $15 \cdot 2^\mu$ kHz | $2048\kappa \cdot 2^{-\mu}$ | $1240\kappa \cdot 2^{-\mu}$ | — |
| C2 | 139 | $15 \cdot 2^\mu$ kHz | $4 \cdot 2048\kappa \cdot 2^{-\mu}$ | $2048\kappa \cdot 2^{-\mu}$ | — |

The coverage of a PRACH is determined by the length of CP (TCP) as shown below.

$$TCP >= 2 * Tprop + Td \quad [1]$$

Where:
Tprop is the propagation delay; and
Td is the root mean square (rms) delay spread.

According to the above equation, the maximum inter-node distance for 120 k SCS is around 1.2 km only, which is clearly not enough for IAB node deployment. Hence, in accordance with examples of the disclosure, new PRACH preambles are proposed.

In some examples of the disclosure, the new PRACH preambles are based on the current C2 and/or B4 preamble formats, as these support the largest cell size and link budget in the existing formats, respectively. Thus, for example, it is envisaged that the C2 preamble format may be used as a baseline, as that format supports the largest coverage area. However, in other examples, it is envisaged that other preamble formats may be adopted to utilise the concepts herein described, such as any of the other preamble formats illustrated in Table 3.

$N_{CP}^{RA}$

In some examples, the inventors have proposed a design that utilises the fact that IAB nodes employ higher power and more antennas than the Ues that they support. Hence, examples of the disclosure may be used to reduce the length of the preamble Nu, which defines the Link budget L, whilst increasing the duration of the cyclic prefixes (CP), as a larger propagation delay and a longer delay spread can be tolerated.

In some examples, the inventors have proposed new preamble formats for C2, referred to below in Table 4 as C3, C4 and C5.

TABLE 4

| Format | $L_{RA}$ | $\Delta f^{RA}$ | $N_u$ | $N_{CP}^{RA}$ | Support for restricted sets |
|---|---|---|---|---|---|
| C3 | 139 | $15 \cdot 2^{-\mu}$ kHz | $4 \cdot 2048\kappa \cdot 2^{-\mu}*3/4$ | $2*2048\kappa \cdot 2^{-\mu}$ | |
| C4 | 139 | $15 \cdot 2^{-\mu}$ kHz | $4 \cdot 2048\kappa \cdot 2^{-\mu}*/2$ | $3*2048\kappa \cdot 2^{-\mu}$ | |
| C5 | 139 | $15 \cdot 2^{-\mu}$ kHz | $4 \cdot 2048\kappa \cdot 2^{-\mu}/4$ | $4*2048\kappa \cdot 2^{-\mu}$ | |

In Table 4, for a C3 preamble format, it is noted that the coverage is doubled, but the link budget is reduced by around 1.2 decibels (dB). Alternatively, for C4 preamble format, the coverage is extended by 3 times, but the link budget is reduced by around 3 dB. For a C5 preamble format, the coverage is extended by four times, but the link budget is reduced by around 6 dB. Since IAB nodes comprise more antennas and higher transmission power, the link budget reduction can be advantageously compensated. Thus, in this manner and in some examples, a new preamble format may be employed.

For B4, according to some examples of the disclosure, the coverage can be further extended following the same design principle as above. Here, the length of the preamble (Nu) may be modified as $2048\kappa \cdot 2^{-\mu} * K$ and K=1, 2, . . . 12 and the number of cyclic prefix samples (Nu) may be modified accordingly to $2048\kappa \cdot 2^{-\mu}(12-K)+936\kappa \cdot 2^{-\mu}$ as indicated in Table 5 below.

TABLE 5

| Format | $L_{RA}$ | $\Delta f^{RA}$ | $N_u$ | $N_{CP}^{RA}$ | Support for restricted sets |
|---|---|---|---|---|---|
| $B_K$ | 139 | $15 \cdot 2^\mu$ kHz | $2048\kappa \cdot 2^{-\mu}$ *K | $2048\kappa \cdot 2^{-\mu}$ (12 − K) + $936\kappa \cdot 2^{-\mu}$ | |

The coverage can be extended to around 15 km for 120 k Hz SCS, by adjustment of the value of 'k'.

Figure 6:
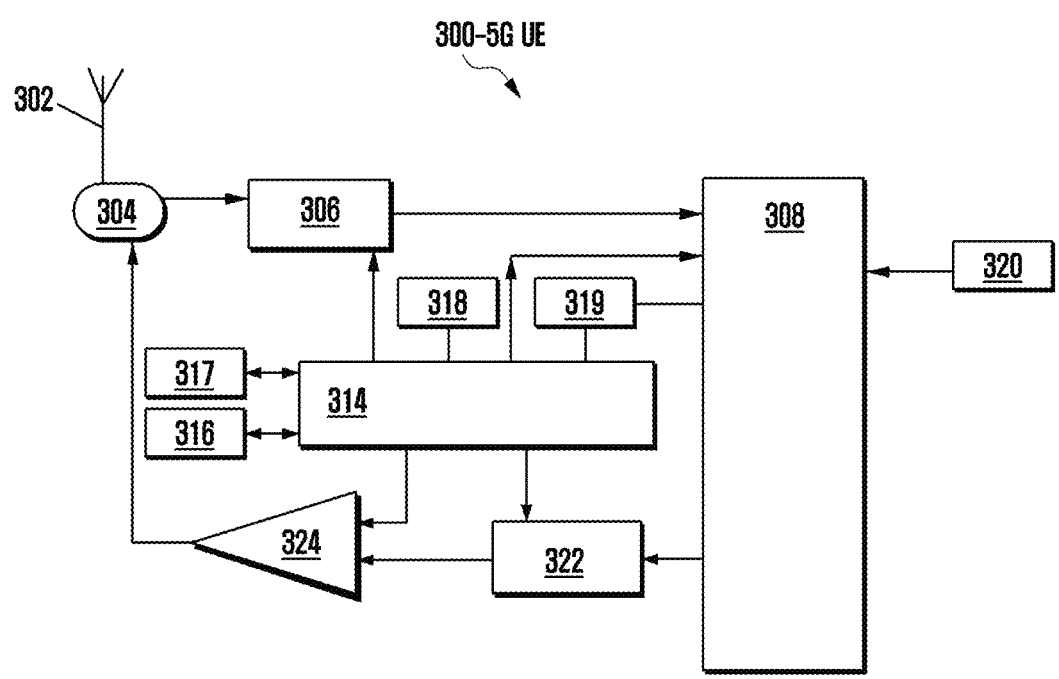
FIG. 6 illustrates a block diagram of a UE, adapted in accordance with some example embodiments of the disclosure.

FIG. 6 illustrates a high level block diagram of a wireless communication unit such as a user equipment (UE) 300 contains an antenna 302, for receiving transmissions, coupled to an antenna switch or duplexer 304 that provides isolation between receive and transmit chains within the UE 300. One or more receiver chains, as known in the art, include receiver front-end circuitry 306 (effectively providing reception, filtering and intermediate or base-band frequency conversion). The receiver front-end circuitry 306 is coupled to a signal processing module 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 300. The controller 314 is also coupled to the receiver front-end circuitry 306 and the signal processing module 308. In some examples, the controller 314 is also coupled to a frequency generation circuit 317 and a memory device 316 that selectively stores operating regimes, such as decoding/encoding functions, synchronization patterns, code sequences, and the like. A timer 318 is operably coupled to the controller 314 to control the timing of operations (e.g., transmission or reception of time-dependent signals) within the UE 300.

As regards the transmit chain, this essentially includes an input module 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

The signal processor module 308 in the transmit chain may be implemented as distinct from the signal processor in the receive chain. Alternatively, a single processor may be used to implement a processing of both transmit and receive signals, as shown in FIG. 6. Clearly, the various components within the wireless communication unit 325 can be realized in discrete or integrated component form, with an ultimate structure therefore being an application-specific or design selection.

In accordance with examples of the disclosure, the processor 308 and transceiver (e.g. transmitter/modulation circuitry 322) of the IAB node are configured to communicate with another IAB node (e.g., 5G gNB child node 212 in FIG. 5) in an IAB architecture by using a RACH that is configured with a UE-specific preamble format, in order to distinguish the UE RACH from another RACH received at the recipient IAB node from another IAB node. In particular examples of the disclosure, the UE-specific preamble format includes a PRACH offset that has been configured by the IAB node, (e.g., either donor IAB node A 222 or derived from the relay node 202 itself, based on its own configuration index obtained from its parent node, e.g., donor IAB node A 222). The processor 308 and receiver front-end circuitry 306 are also configured to receive an acknowledgement of a successful RACH attempt in response to the UE-specific preamble format. The two options can be applied in centralized and distributed IAB networks, respectively.

In accordance with examples of the disclosure, the processor 308 and transceiver (e.g. transmitter/modulation circuitry 322) of the UE are additionally or alternatively configured to communicate with an IAB node in an IAB architecture by using a PRACH that is configured with an offset, in order to avoid violation of the half-duplex constraint and avoid conflict with other UEs, in order to distinguish the UE PRACH from another IAB node RACH.

In some examples, at least one PRACH offset is described as it is envisaged that, say, a positive offset may be applied in one direction, say by an IAB node, and a negative offset may be applied in the other direction, say for a UE, thereby allowing half-duplex operation by assigning a PRACH offset between more than one entity in the communication chain.

Figure 7:
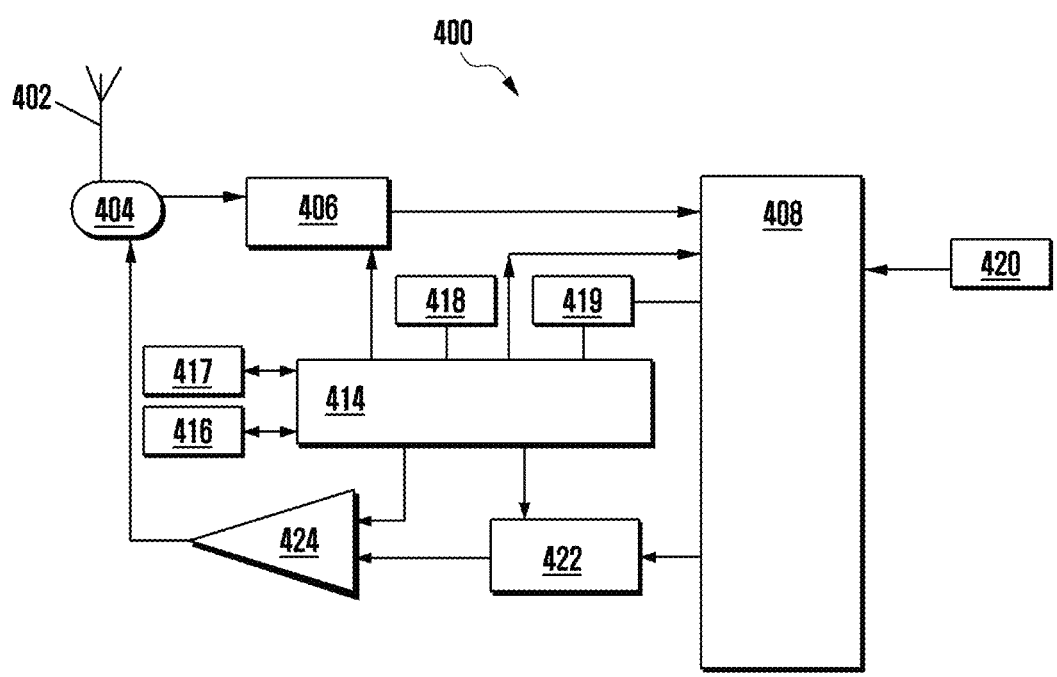
FIG. 7 illustrates a block diagram of an IAB base station (or node), adapted in accordance with some example embodiments of the disclosure.

Referring now to FIG. 7, high level block diagram of an IAB node (e.g., a 5G wireless base station) 400 is illustrated, where the IAB node 400 has been adapted in accordance with some example embodiments of the disclosure. The IAB node 400 contains an antenna 402, for receiving transmissions, coupled to an antenna switch or duplexer 404 that provides isolation between receive and transmit chains within the IAB node 400. One or more receiver chains, as known in the art, include receiver front-end circuitry 406 (effectively providing reception, filtering and intermediate or base-band frequency conversion). The receiver front-end circuitry 406 is coupled to a signal processing module 408 (generally realized by a digital signal processor (DSP)). A skilled artisan will appreciate that the level of integration of receiver circuits or components may be, in some instances, implementation-dependent.

The controller 414 maintains overall operational control of the IAB node 400. The controller 414 is also coupled to the receiver front-end circuitry 406 and the signal processing module 408. In some examples, the controller 414 is also coupled to a frequency generation circuit 417 and a memory device 416 that selectively stores operating regimes, such as decoding/encoding functions, synchronization patterns, code sequences, and the like. A timer 418 is operably coupled to the controller 414 to control the timing of operations (e.g., transmission or reception of time-dependent signals) within the IAB node 400.

As regards the transmit chain, this essentially includes an input module 420, coupled in series through transmitter/modulation circuitry 422 and a power amplifier 424 to the antenna 402, antenna array, or plurality of antennas. The transmitter/modulation circuitry 422 and the power amplifier 424 are operationally responsive to the controller 414. The signal processor module 408 in the transmit chain may be implemented as distinct from the signal processor in the receive chain. Alternatively, a single processor may be used to implement a processing of both transmit and receive signals, as shown in FIG. 7. Clearly, the various components within the IAB node 400 can be realized in discrete or integrated component form, with an ultimate structure therefore being an application-specific or design selection.

In accordance with examples of the disclosure, the processor 408 and transceiver (e.g., transmitter/modulation circuitry 422) of the IAB, when configured as a donor IAB node (such as donor IAB node 222 in FIG. 5) are configured to generate a PRACH offset for broadcasting or routing to its child IAB node(s) and UEs associated with the child IAB node(s). In some examples, the processor 408 and transceiver (e.g., transmitter/modulation circuitry 422) of the IAB, when configured as a child IAB node (such as child IAB node 212 in FIG. 5) are configured to derive a PRACH offset based on its own configuration index obtained from its parent IAB node. This PRACH offset is then broadcast or routed to UEs associated with the child IAB node(s).

In accordance with some examples of the disclosure, it is envisaged that the offset configuration may additionally take resource allocation constraint into consideration. For example, in this context, the resources that are not available to child links may not be assigned to UE PRACH, because the UE PRACH can only use resources that are available to child links and the aforementioned offset configuration should avoid being used in such situations. Thus, in one example, an initial determination may be made as to whether the resources, e.g., the time slots, available to child links may not be assigned to UE PRACH, and if they are available to be assigned, then the PRACH offset configuration procedure is adopted, if needed to avoid a conflict.

It has been agreed in RAN1 of 3GPP for 5G that the resources will be categorized into two types: 1) 'hard' type, where the resource can always be used by child links and 2) 'soft' type, where the resources are not always available to the child links but can be configured to be available to the child links. Thus, in some examples, in one case, it is envisaged that some resources currently available to the child links may be configured to be not available in future and in this case, UE PRACH cannot use such resources.

In some examples, the range of the offset may be based on the based on maximum configuration index 39. In this context, basically, the offset can be configured from −39 to 39. If this offset is converted to a binary expression, its range can be −64 to 64. It is envisaged that in other examples, the offset range may vary and be more or less than this example. For example, the offset range may be different for the child IAB nodes because of different PRACH configurations. If the periodicity is extended by N times, the range can also be extended as from −N*64 to N*64.

In some examples, the granularity of the offset may be preset or dynamically changed. For example, the offset may be defined in terms of: a symbol, a slot/mini slot, a subframe, a radio frame indicated by system frame number, etc. In this manner, the system can adapt to the prevailing conditions, as it might not be feasible to avoid PRACH overlapping if only one granularity is used. In this manner, in some examples, the granularity of the offset may be configured in terms of a single resource or across a combination of multiple granularities.

For IAB node random access, the collision probability is much lower due to a limited number of IAB nodes. Hence, the periodicity of such resources, between successively used RACH slots, can be configured larger.

FIG. 8 illustrates an orthogonal multiplexing example representation 500, according to examples of the disclosure. The orthogonal multiplexing example representation 500 employs time multiplexing of access link and backhaul link random access resource allocation using different timeslots. For example, FIG. 8 illustrates a 5G subframe, with slot i 510 and slot i+2 514 and slot i+4 518 allocated for access PRACH 530, with fewer timeslots (e.g., slot i+1 512 and slot i+5 519) allocated for backhaul PRACH 520. As the number of UEs associated with one (parent) IAB node, e.g., is likely to be much larger than the number of IAB nodes, examples of the disclosure propose that the UE is allocated more of the PRACH opportunities in more frequent timeslots, as compared to RACH allocations for IAB nodes.

In this example, the same frequency is again used for both backhaul PRACH 520 by the IAB node and access PRACH 530, for example by the donor IAB node 222 or child IAB node 212 or UE node 216 in FIG. 5. As illustrated, in this example, the 'sharing' between access link random access resources 530 and backhaul link random access resources 520 may be limited to allocation of individual time slots for a particular use, such as slot i 510 and slot i+2 514 and slot i+4 518 being allocated for access link random access resources 530. In contrast, slot i+1 512 and slot i+5 519 are allocated for backhaul link random access resources 520, as shown. In this manner, time domain multiplexing can be achieved with no disruption to access PRACH.

Figure 9:
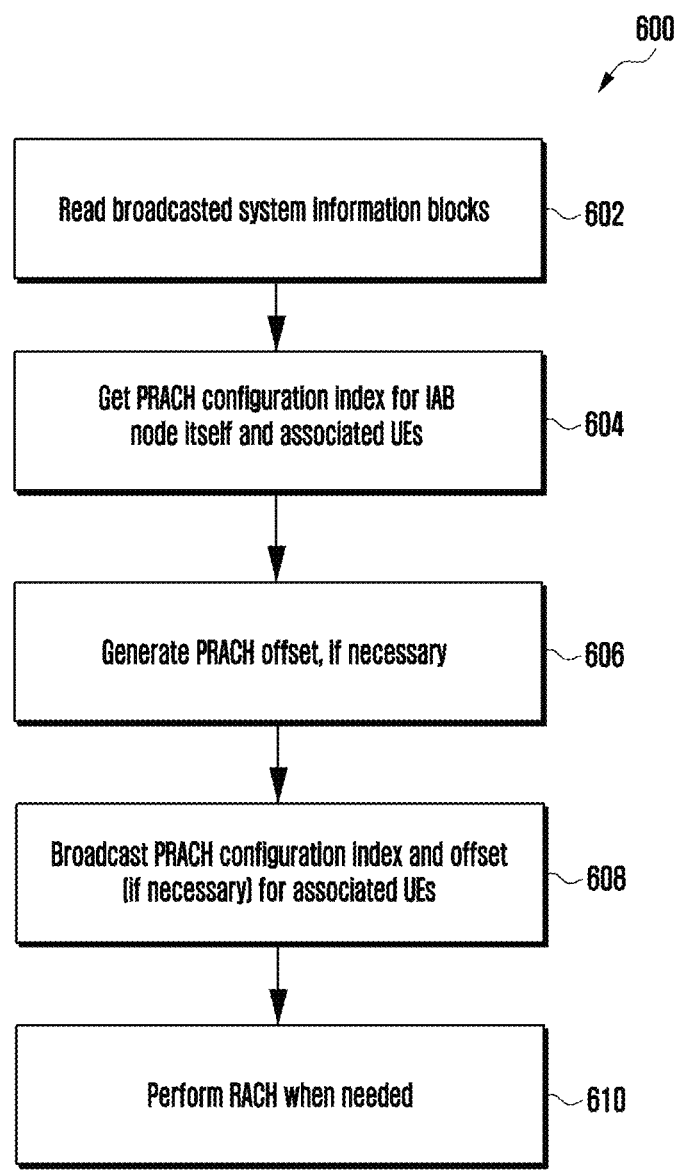
FIG. 9 illustrates a first example of a simplified flowchart of an IAB node procedure, in accordance with some example embodiments of the disclosure.

Referring now to FIG. 9, a first example of a simplified flowchart 600 of an IAB node procedure (e.g., a 5G base station (gNB)) is illustrated in accordance with some example embodiments of the disclosure. The flowchart 600 starts at 602 with the IAB node reading broadcast system information blocks (SIBs) in order to obtain time and frequency location of the PRACH (e.g., PRACH index) information. It will be appreciated that there are many possible time and frequency locations for PRACH, and in 5G NR each location is associated with a single PRACH index. Therefore, a unique time and frequency location may be derived from the PRACH index. However, indexing those time and frequency locations is only one of the envisaged approaches to locate PRACH, within the context of determining the time and frequency location of PRACH. At 604, the IAB node obtains the PRACH configuration index for the IAB node itself, as well as each of the associated UEs. At 606, the IAB node configures a PRACH offset, if needed. At 608, following a configuration of a PRACH offset (if needed) at 606, the IAB node broadcasts the PRACH configuration index (including the offset, if appropriate) to the associated UEs. Thereafter, at 610, the IAB node performs a RACH operation using the RACH configurations, as and when needed.

Figure 10:
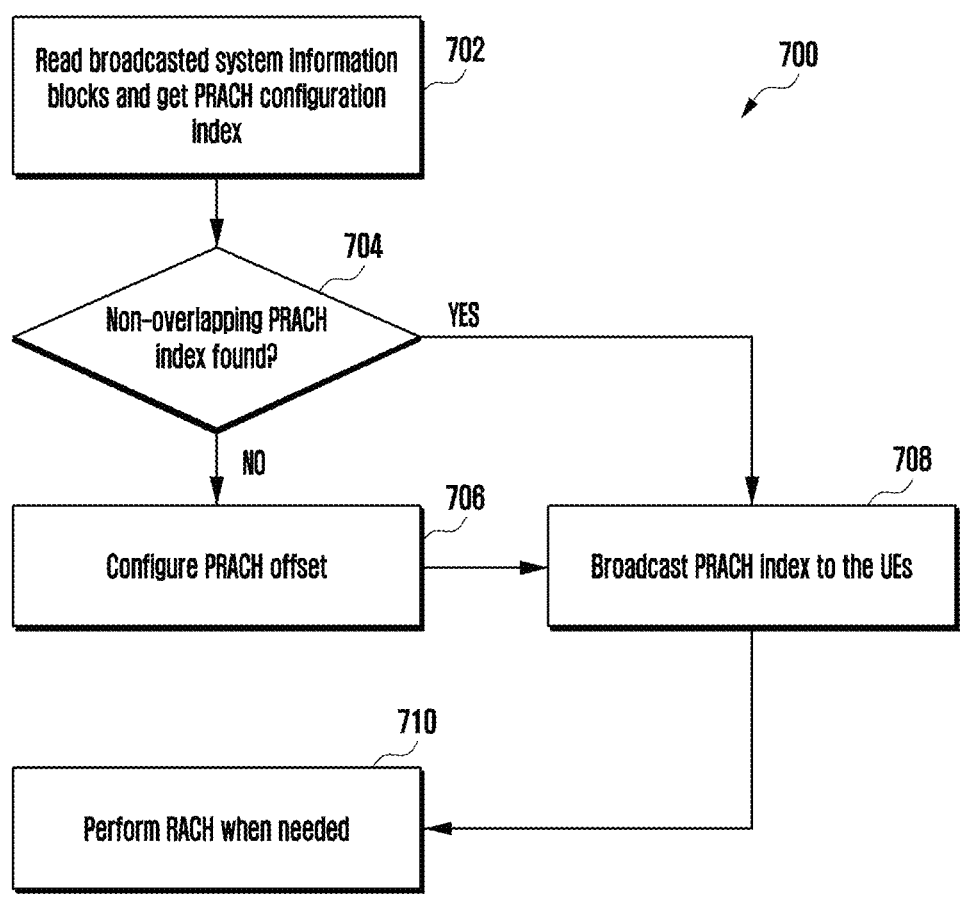
FIG. 10 illustrates a second example of a simplified flowchart of an IAB node procedure, in accordance with some example embodiments of the disclosure.

Referring now to FIG. 10 a second example of a simplified flowchart 700 of an IAB node procedure (e.g., a 5G base station (gNB)) is illustrated in accordance with some example embodiments of the disclosure. The flowchart 700 starts at 702 with the IAB node reading broadcast system information blocks (SIBs) in order to obtain time and frequency location of the PRACH (e.g., PRACH index) information. At 704, the IAB node determines whether (or not) a non-overlapping PRCH index has been found. If, at 704, the IAB node has not located a non-overlapping PRACH index, then the IAB node configures a PRACH offset at 706, as described previously. At 708, following a configuration of a PRACH offset at 706 or if the IAB node has located a non-overlapping PRACH index at 704, then the IAB node broadcasts the PRACH index (including the offset, if appropriate) to the UEs. Thereafter, at 710, the IAB node performs a RACH operation using the RACH configurations, as and when needed.

Figure 11:
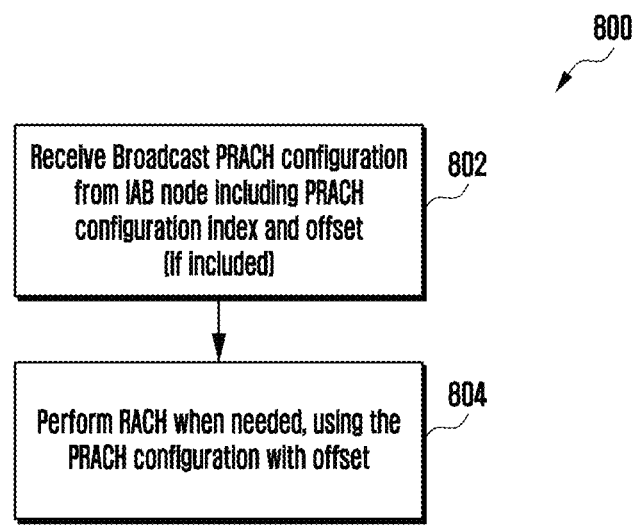
FIG. 11 illustrates an example of a simplified flowchart of a remote wireless communication unit operation when receiving a PRACH configuration from a serving IAB node, in accordance with some example embodiments of the disclosure.

Referring now to FIG. 11, an example of a simplified flowchart 800 of a remote wireless communication unit operation, when receiving a PRACH configuration from a serving IAB node, is illustrated in accordance with some example embodiments of the disclosure. In this example, at 802, a remote wireless communication unit (such as UE C 216 or UE B 206 in FIG. 5, receives broadcast PRACH configuration from IAB node, which includes a PRACH configuration index and offset according to examples of the disclosure. At 804, the remote wireless communication unit implements a PRACH operation using the received configuration index and offset.

Figure 12:
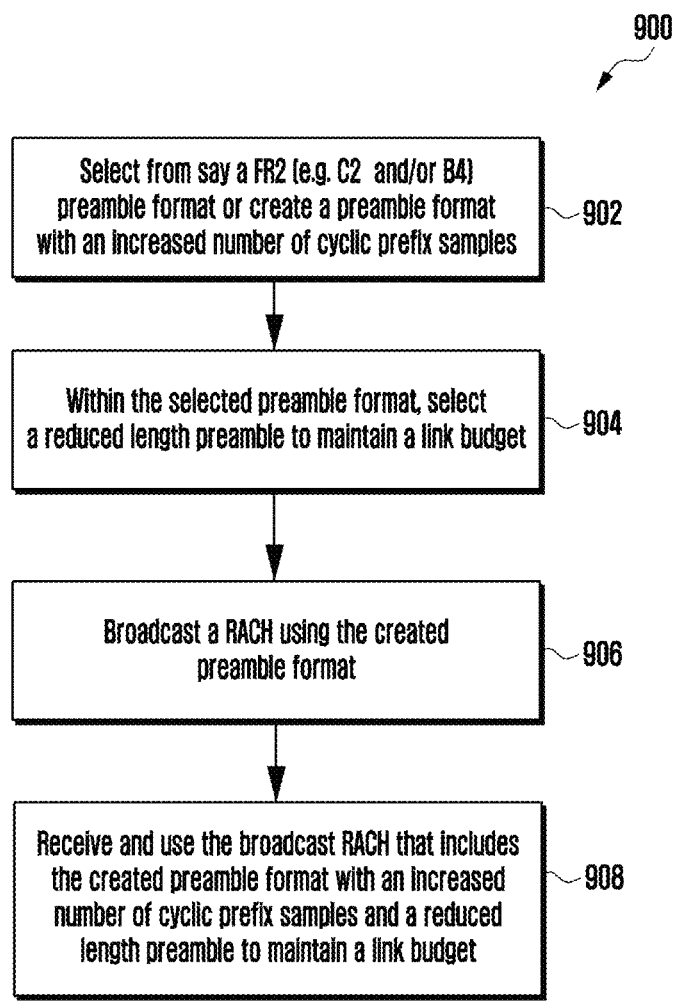
FIG. 12 illustrates a simplified flowchart of a selection or creation of a preamble format by a serving IAB node, and subsequent use by a remote wireless communication unit, in accordance with some example embodiments of the disclosure.

Referring now to FIG. 12 a simplified flowchart 900 of a selection or creation of a preamble format by a serving IAB node, and subsequent use by a remote wireless communication unit, is illustrated in accordance with some example embodiments of the disclosure. At 902, the serving IAB node select from, say a FR2 (e.g., C2 and/or B4) preamble format, or creates a preamble format with an increased number of cyclic prefix samples. At 904, the serving IAB node selects a reduced length preamble to maintain a link budget for the preamble format. At 906 the serving IAB node broadcasts a RACH using the created preamble format to its associated UEs. At 908, one or more of the associated UEs receives and uses the broadcast RACH having the created preamble format with an increased number of cyclic prefix samples and a reduced length preamble to maintain a link budget.

In particular, it is envisaged that the aforementioned concepts can be applied by a semiconductor manufacturer to any integrated circuit comprising a signal processor configured to perform any of the aforementioned operations. Furthermore, the concept can be applied to any circuit that is able to configure, process, encode and/or decode signals for wireless distribution. It is further envisaged that, for example, a semiconductor manufacturer may employ the concept in a design of a stand-alone device, such as a digital signal processor, or application-specific integrated circuit (ASIC) and/or any other sub-system element.

It will be appreciated that, for clarity purposes, the above description has described embodiments of the disclosure with reference to different functional units and processors. However, it will be apparent that any suitable distribution of functionality between different functional units or processors, for example with respect to the signal processor may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the disclosure may be implemented in any suitable form including hardware, software, firmware or any combination of these. The disclosure may optionally be implemented, at least partly, as computer software running on one or more data processors and/or digital signal processors or configurable module components such as FPGA devices. Thus, the elements and components of an embodiment of the disclosure may be physically, functionally and logically implemented in any suitable way. Indeed, the functionality may be implemented in a single unit, in a plurality of units or as part of other functional units.

Although the present disclosure has been described in connection with some embodiments, it is not intended to be limited to the specific form set forth herein. Rather, the scope of the present disclosure is limited only by the accompanying claims. Additionally, although a feature may appear to be described in connection with particular embodiments, one skilled in the art would recognize that various features of the described embodiments may be combined in accordance with the disclosure. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Thus, communication units such as gNBs functioning as IAB nodes and terminal devices such as UEs, a communication system and methods relating to RACH use for access and backhaul have been described, wherein the aforementioned disadvantages with prior art arrangements have been substantially alleviated.

In some examples, the aforementioned concepts may be implemented within the system information blocks (SIBs) on 3GPP™ standards. For example, after an initial cell synchronization process is completed, a UE will read the master information block. Then the UE can read SIB1 and SIB2 in order to obtain useful information related to cell access, SIB scheduling and radio resource configuration. SIB2 carries radio resource configuration information including Random Access CHannel (RACH) related parameters that are common for all UEs. In this regard, it is not possible that the IAB node is able to configure two different sets of RACH parameters to both the UE and one or more other IAB nodes, respectively, at the same time.

The main impacts of this disclosure on 3GPP standards are on system information. After initial cell synchronization process is completed, the UE will read the master information block and RMSI to obtain the PRACH configuration. In order to be able to configure offset, the RACH configuration information elements (IEs) in radio resource control (RRC), such as RACH-ConfigGeneric have been expanded, as indicated below. In some examples, PRACH offset may be added to indicate that additional information elements (IEs) or parameters are defined for PRACH offset. In some examples of the disclosure, three ways are proposed in order to achieve this:

(i) define new RRC IEs; and
(ii) add new parameters to configure different PRACH settings.

In order to be able to configure the offset, the RACH configuration IEs in RRC, such as RACH-ConfigGeneric should be expanded. One example of this UE determination is illustrated below, where the new parameters are highlighted in italicised bold. If a different offset value is needed for child IAB nodes, it is envisaged that an additional IE can be added as well.

RACH-ConfigGeneric Information Element

```
-- ASN1START
-- TAG-RACH-CONFIG-GENERIC-START
RACH-ConfigGeneric ::=              SEQUENCE {
prach-ConfigurationIndex            INTEGER (0..255),
prach-ConfigurationIndex_offset     INTEGER (-64..64),
prach-ConfigurationIndex_IAB_offset INTEGER (-N*64..N*64),
msg1-FDM                            ENUMERATED {one, two, four, eight},
msg1-FrequencyStart                 INTEGER (0..maxNrofPhysicalResourceBlocks-1),
   zeroCorrelationZoneConfig        INTEGER(0..15),
   preambleReceivedTargetPower      INTEGER (-202..-60),
   preambleTransMax                 ENUMERATED {n3, n4, n5, n6, n7,  n8, n10, n20, n50, n100, n200},
   powerRampingStep                 ENUMERATED {dB0, dB2, dB4, dB6},
   ra-ResponseWindow                ENUMERATED {sl1, sl2, sl4, sl8, sl10, sl20, sl40, sl80},
   ...
}
-- TAG-RACH-CONFIG-GENERIC-STOP
-- ASN1STOP
```

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with various embodiments, various changes and modifications may be suggested to one skilled in the art. It is intended that the present disclosure encompass such changes and modifications as fall within the scope of the appended claims.

What is claimed is:

1. A base station in an integrated access and backhaul (IAB) wireless communication system, the base station comprising:
    a transceiver; and
    a processor configured to:
        control the transceiver to broadcast a system information block (SIB) including first information on a first physical random access channel (PRACH) configuration index for a terminal, second information on a second PRACH configuration index for an IAB node, and third information on a PRACH offset for the IAB node, and
        control the transceiver to receive, from the IAB node, a random access preamble on resources identified based on the second information on the second PRACH configuration index for the IAB node and the third information on the PRACH offset for the IAB node,
    wherein the third information on the PRACH offset for the IAB node includes at least one of a first offset value on a slot, a second offset value on a subframe and a third offset value on a radio frame, and
    wherein the base station is a donor IAB node.

2. The base station of claim 1, wherein the third information on the PRACH offset for the IAB node ranges up to 39.

3. The base station of claim 1, wherein the processor is further configured to control the transceiver to receive, from the terminal, a random access preamble on resources identified based on the first information on the first PRACH configuration index for the terminal.

4. An integrated access and backhaul (IAB) node in an IAB wireless communication system, the IAB node comprising:

a transceiver; and
a processor configured to:
- control the transceiver to receive, from a base station, a system information block (SIB) including first information on a first physical random access channel (PRACH) configuration index for a terminal, second information on a second PRACH configuration index for an IAB node and third information on a PRACH offset for the IAB node,
- identify resources based on the second information on the second PRACH configuration index for the IAB node and the third information on the PRACH offset for the IAB node, and
- control the transceiver to transmit, to the base station, a random access preamble on the identified resources, wherein the third information on the PRACH offset for the IAB node includes at least one of a first offset value on a slot, a second offset value on a subframe, or a third offset value on a radio frame, wherein the base station is a donor IAB node.

5. The IAB node of claim 3, wherein the third information on the PRACH offset for the IAB node ranges up to 39.

6. A method performed by a base station in an integrated access and backhaul (IAB) wireless communication system, the method comprising:
- broadcasting a system information block (SIB) including first information on a first physical random access channel (PRACH) configuration index for a terminal, second information on a second PRACH configuration index for an IAB node, and third information on the PRACH offset for the IAB node, and
- receiving, from the IAB node, a random access preamble on resources identified based on the second information on the second PRACH configuration index for the IAB node and the third information on the PRACH offset for the IAB node, wherein the third information on the PRACH offset for the IAB node includes at least one of a first offset value on a slot, a second offset value on a subframe and a third offset value on a radio frame, and wherein the base station is a donor IAB node.

7. The method of claim 6, wherein the third information on the PRACH offset for the IAB node ranges up to 39.

8. The method of claim 6, further comprising:
- receiving, from the terminal, a random access preamble on resources identified based on the first information on the first PRACH configuration index for the terminal.

9. A method performed by an integrated access and backhaul (IAB) node in an IAB wireless communication system, the method comprising:
- receiving, from a base station, a system information block (SIB) including first information on a first physical random access channel (PRACH) configuration index for a terminal, second information on a second PRACH configuration index for an IAB node and third information on a PRACH offset for the IAB node,
- identifying resources based on the second information on the second PRACH configuration index for the IAB node and the third information on the PRACH offset for the IAB node, and
- transmitting, to the base station, a random access preamble on the identified resources, wherein the third information on the PRACH offset for the IAB node includes at least one of a first offset value on a slot, a second offset value on a subframe, or a third offset value on a radio frame, wherein the base station is a donor IAB node.

10. The method of claim 9, wherein the third information on the PRACH offset for the IAB node ranges up to 39.

* * * * *